UNITED STATES PATENT OFFICE.

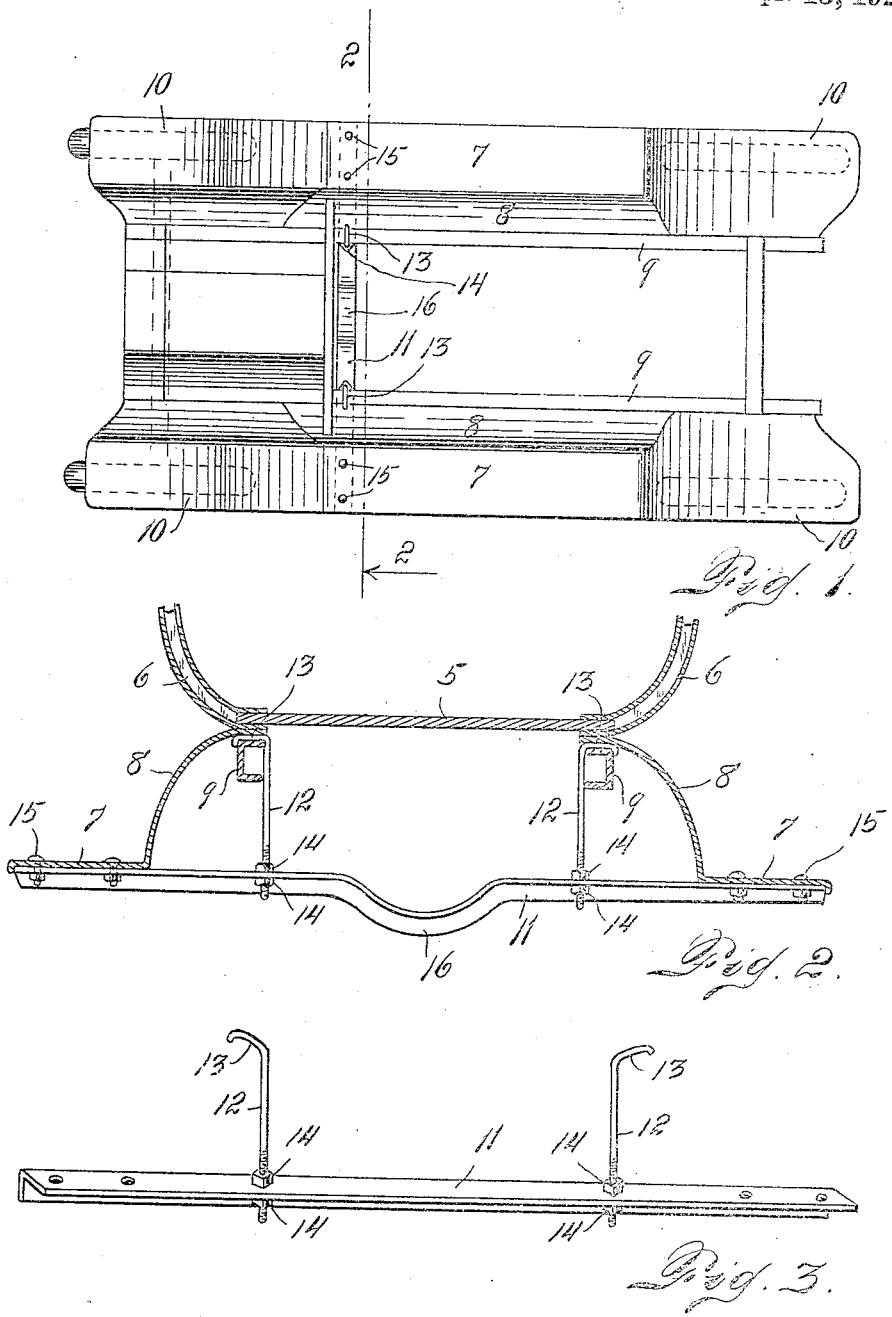

ARTHUR W. KIRCHNER, OF DENVER, COLORADO, ASSIGNOR OF ONE-HALF TO GEORGE J. PILLE, OF DENVER, COLORADO.

RUNNING-BOARD AND FENDER SUPPORT FOR AUTOMOBILES.

1,337,078.  Specification of Letters Patent.  Patented Apr. 13, 1920.

Application filed September 18, 1916. Serial No. 120,646.

*To all whom it may concern:*

Be it known that I, ARTHUR W. KIRCHNER, citizen of the United States, residing at the city and county of Denver and State of Colorado, have invented certain new and useful Improvements in Running-Board and Fender Supports for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to improvements in automobiles and pertains more particularly to an improved form of tie rod adapted to be suspended from the chassis or frame of the machine and attached to the running boards on the opposite side of the car.

In the present construction of automobiles the running boards which extend considerably beyond the chassis of the machine on either side are rather loosely supported, frequently being attached to the body of the car only by means of a sheet metal mud guard. The result is that the running boards, especially in the cars of cheaper construction, become bent downwardly out of shape or else become so loosened that they rattle and produce an unnecessary and unpleasant sound whenever the machine passes over a rough place in the road or street.

It is the object of the present invention to overcome this difficulty and the invention consists primarily in the provision of a transversely disposed tie rod adapted to be suspended from the chassis of the machine and rigidly secured to the running boards at either side of the car. The invention further contemplates the provision of adjustable means by which the tie rod may be rigidly held in place and tightened from time to time as the running board on either side of the car becomes loosened or bent downwardly. This device also serves the function of reinforcing the mud guards which extend over the front and rear wheels of the machine and which are usually attached to or integral with the curved mud shield.

With these and other objects in view the invention consists in the combination and arrangement of parts fully set forth in the following specification, illustrated in the accompanying drawing and more particularly pointed out in the appended claims.

Referring now to the drawing, Figure 1 is a top plan view of the chassis and lower frame structure of an automobile having the present invention applied thereto.

Fig. 2 is a transverse vertical section taken on the line 2—2 of Fig. 1 looking in the direction of the arrow drawn to a larger scale, and Fig. 3 is a perspective view of a modified form of the invention before being applied to a machine.

Referring now to the drawing, the floor of a machine is shown at 5 having the side body portion 6 secured to or formed integral with the curved mud shield 8, the upper ends of which are fastened between the longitudinal chassis bars 9 and the extremities of the body sides 6 as best shown in Fig. 2.

In the type of machine illustrated in Fig. 1, the mud guards 10 for the wheels are formed integral with the shield plates 8, this being the case with many automobiles of recent construction. The transversely disposed tie rod which forms the principal part of the present invention consists as shown in Figs. 1 and 2, of a piece of angle iron 11 adapted to be suspended by a pair of vertically disposed rods 12 from the chassis bars 9. The rods 12 are formed with upper hooked ends 13 which are adapted to engage the upper edges of the chassis bars 9 while the lower ends of the rods 12 are threaded and pass through perforations suitably formed in the tie rod 11. A pair of adjustable nuts 14 are provided for each rod 12 and are adapted to be applied to the threaded portion thereof one above and one below the surface of the tie rod 11. The outer ends of the tie rod 11 are fixedly secured to the running board 7 by means of bolts and nuts 15. In the form of the invention illustrated in Figs. 1 and 2 the tie rod 11 is formed with a centrally located curved portion 16 in order to enable it to pass beneath any downwardly projecting parts of the engine or mechanism. This, however, is not necessary in the application of the invention to some machines and the bar may, if desired, be made straight throughout its length as shown in Fig. 3.

In applying the device to a new car the rods 12 are hooked over the chassis bars 9, the outer ends of the rod 11 are bolted to the under sides of the running board 7 and the lower adjusting nuts 14 are moved to the desired position on the threaded portions of the rods 12, the upper nuts 14 are then screwed down tightly against the upper surface of the tie rod 11 and serve to lock the parts in the upper adjusted position. It will be seen that the running boards and mud guards together with the curved shield plates 8 are all reinforced and that the excess weight which may be placed upon the running boards is suspended directly from the chassis rods 9. If the device is to be applied to an old machine or one which has received rough usage the running boards are bent upwardly into the desired position and the parts applied and adjusted in such manner as to prevent the running boards from again becoming loosened or bent downwardly. This device will also prevent any rattling of the parts and as this is a drawback ever present in most of the cheap cars after they have been used a few times the invention serves a two-fold purpose, viz: a reinforcing function for parts otherwise weak and a sound deadening function for parts which usually rattle.

Having described my invention what I claim is:

1. The combination with the chassis and running boards of an automobile of a transversely disposed tie rod, means for suspending said rod comprising two rods having hook shaped upper extremities adapted to detachably engage the opposite side members of the chassis of the machine, their lower extremities projecting through the tie rod intermediate the extremities of the latter, and means mounted upon said lower extremities and adapted to engage the tie rod both from above and below for adjustably locking the latter in place, said tie rod having its ends rigidly attached to the running boards.

2. The combination with the chassis and running boards of an automobile of a transversely disposed brace, means for suspending said brace comprising two rods having hook shaped upper extremities adapted to detachably engage the opposite side members of the chassis of the machine, their lower extremities projecting through the brace intermediate the extremities of the latter, and means mounted upon said lower extremities for adjustably locking the said brace in place, the latter having its ends rigidly attached to the running boards.

3. The combination with the chassis and running boards of an automobile of a transversely disposed tie rod, a pair of vertically disposed rods supporting said rod intermediate its ends the upper extremities of said rods being hook shaped and adapted to detachably engage the opposite side members of the chassis of the machine, the tie rod having its end rigidly attached to said running boards and vertically adjustable means for locking said tie rod in position.

4. The combination with the chassis and running board of an automobile of a transversely extending brace, means suspending said brace comprising two rods having hook shaped upper ends engaging the opposite side members of the chassis of the machine, their lower ends engaging the brace intermediate its extremities, the extremities of the brace being rigidly attached to the running boards.

5. A brace for the running boards of automobiles comprising a tie rod adapted to extend transversely of the machine and have its ends engage the under sides of the running boards, vertically disposed rods mounted on said tie rod and having their upper ends hooked to engage the side bars of the chassis of the machine to suspend the tie rod therefrom.

In testimony whereof I affix my signature in presence of two witnesses.

ARTHUR W. KIRCHNER.

Witnesses:
 CHAS. E. PARSONS,
 OTTO E. HODDICK.